(12) United States Patent
Cho et al.

(10) Patent No.: US 8,792,074 B2
(45) Date of Patent: Jul. 29, 2014

(54) LIQUID CRYSTAL DISPLAY

(75) Inventors: Se-Hyoung Cho, Seoul (KR);
Kwang-Chul Jung, Seongnam-si (KR);
Mee-Hye Jung, Suwon-si (KR);
Chong-Chul Chai, Seoul (KR);
Young-Eun Jo, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 630 days.

(21) Appl. No.: 12/841,732

(22) Filed: Jul. 22, 2010

(65) Prior Publication Data

US 2011/0215993 A1 Sep. 8, 2011

(30) Foreign Application Priority Data

Mar. 5, 2010 (KR) ........................ 10-2010-0020137

(51) Int. Cl.
*G02F 1/1343* (2006.01)
(52) U.S. Cl.
USPC .......................................... 349/141
(58) Field of Classification Search
USPC .......................................... 349/141
See application file for complete search history.

(56) References Cited

U.S. PATENT DOCUMENTS

| 6,288,763 | B1 * | 9/2001 | Hirota ............................ 349/141 |
| 7,292,303 | B2 * | 11/2007 | Song et al. .................... 349/141 |
| 7,599,033 | B2 * | 10/2009 | Son ................................ 349/141 |
| 7,599,035 | B2 * | 10/2009 | Park et al. ..................... 349/141 |
| 2008/0204613 | A1 | 8/2008 | Kim et al. |

FOREIGN PATENT DOCUMENTS

| JP | 09-033943 | 2/1997 |
| JP | 2003-131636 | 5/2003 |
| JP | 2003-149664 | 5/2003 |
| JP | 2006-091274 | 4/2006 |
| KR | 100275213 | 9/2000 |
| KR | 1020070118509 | 12/2007 |
| KR | 1020080049366 | 6/2008 |
| KR | 1020080095711 | 10/2008 |
| KR | 1020080099426 | 11/2008 |

OTHER PUBLICATIONS

English Abstract for Publication No. 20080204613.
English Abstract for Publication No. 100275213.
English Abstract for Publication No. 2003-131636.
English Abstract for Publication No. 2003-149664.
English Abstract for Publication No. 2006-091274. English Abstract for Publication No. 1020070118509.
English Abstract for Publication No. 1020080049366.
English Abstract for Publication No. 1020080095711.
English Abstract for Publication No. 1020080099426.

\* cited by examiner

*Primary Examiner* — James Dudek
(74) *Attorney, Agent, or Firm* — F. Chau & Associates, LLC

(57) ABSTRACT

A liquid crystal display includes a substrate, first and second pixels neighboring in a row direction, third and fourth pixels respectively neighboring the first and second pixel in a column direction, wherein the pixels are formed on the substrate, first and second data lines formed on the substrate that transmit a data voltage, and a voltage line disposed between the first and second data lines. The pixels respectively include a first switching element connected to the first or second data line, a second switching element connected to the voltage line, a first pixel electrode connected to the first switching element, and a second pixel electrode connected to the second switching element. A position of the first pixel electrode with respect to the second pixel electrode of the first pixel is opposite to a position of the first pixel electrode with respect to the second pixel electrode of the second pixel.

20 Claims, 14 Drawing Sheets

LIQUID CRYSTAL DISPLAY

CROSS-REFERENCE TO RELATED APPLICATION

This application claims priority from Korean Patent Application No. 10-2010-0020137 filed in the Korean Intellectual Property Office on Mar. 5, 2010, the contents of which are herein incorporated by reference in their entirety.

BACKGROUND OF THE INVENTION (a) Field of the Invention

The present invention relates to a liquid crystal display.

(b) Description of the Related Art

Liquid crystal displays (LCDs) are one of the most widely used flat panel displays. An LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field in the LC layer that determines the orientations of LC molecules therein to adjust polarization of incident light.

An LCD also includes switching elements connected to the respective pixel electrodes, and a plurality of signal lines such as gate lines and data lines for controlling the switching elements and thereby applying voltages to the pixel electrodes.

The liquid crystal display receives an input image signal from an external graphics controller, the input image signal contains luminance information of each pixel PX, and the luminance is represented by gray levels of varying intensity. Each pixel is supplied with the data voltage corresponding to the desired luminance information. The data voltage applied to the pixel appears as a pixel voltage according to a difference between a reference voltage such as a common voltage and the data voltage, and each pixel displays luminance representing a gray of the image signal according to the pixel voltage. Here, the range of the pixel voltage that is applicable to the liquid crystal display is determined according to a driver.

The driver of the liquid crystal display may be mounted on the display panel in a form of a plurality of integrated circuit (IC) chips, or may be installed on a flexible circuit film and attached to the display panel, but the use of IC chips involves a high percentage of the manufacturing cost of the liquid crystal display.

SUMMARY OF THE INVENTION

A liquid crystal display according to an exemplary embodiment of the present invention includes a first substrate, a first pixel and a second pixel that neighbor each other in a row direction, a third pixel and a fourth pixel respectively neighboring the first pixel and the second pixel in a column direction, wherein the first to fourth pixels are formed on the first substrate, a first data line and a second data line formed on the first substrate and respectively transmitting a data voltage, and a first voltage line disposed between the first data line and the second data line. The first pixel, the second pixel, the third pixel, and the fourth pixel respectively include a first switching element connected to either the first data line or the second data line, a second switching element connected to the first voltage line, a first pixel electrode connected to the first switching element, and a second pixel electrode connected to the second switching element. A position of the first pixel electrode with respect to the second pixel electrode of the first pixel is opposite to a position of the first pixel electrode with respect to the second pixel electrode of the second pixel.

The first pixel electrode and the second pixel electrode may respectively include a plurality of branches, and the branches of the first pixel electrode and the branches of the second pixel electrode may be alternately interposed with each other.

A branch arrangement sequence of the first pixel electrode and of the second pixel electrode in the first pixel may be opposite to a branch arrangement sequence of the first pixel electrode and the second pixel electrode in the third pixel.

The branches of the first pixel electrode and the branches of the second pixel electrode may be periodically curved with a zigzag shape.

The first data line, the second data line, and the first voltage line, may be periodically curved with a zigzag shape according to the first pixel electrode and the second pixel electrode.

The first voltage line may be supplied with two different voltages alternately by frame.

The liquid crystal display may further include a second voltage line extending parallel to the first voltage line, wherein the second voltage line may be supplied with a different voltage from the first voltage line.

The liquid crystal display may further include a first common voltage line disposed on an edge portion of the first substrate and intersecting the first and second data lines, wherein the first voltage line may be connected to the first common voltage line, thereby receiving a voltage.

The liquid crystal display may further include a second common voltage line disposed on an edge portion of the first substrate and intersecting the first and second data lines, wherein the second voltage line may be connected to the second common voltage line, thereby receiving a voltage.

The liquid crystal display may further include a data driver respectively applying a data voltage to the first data line and the second data line, wherein the first voltage line and the second voltage line respectively receive a voltage from the data driver.

The liquid crystal display may further include a second substrate facing the first substrate and a liquid crystal layer interposed between the first substrate and the second substrate. The liquid crystal layer has positive dielectric anisotropy, and may be in a vertical alignment mode in the absence of an electric field.

DESCRIPTION OF SYMBOLS

Figure 1:
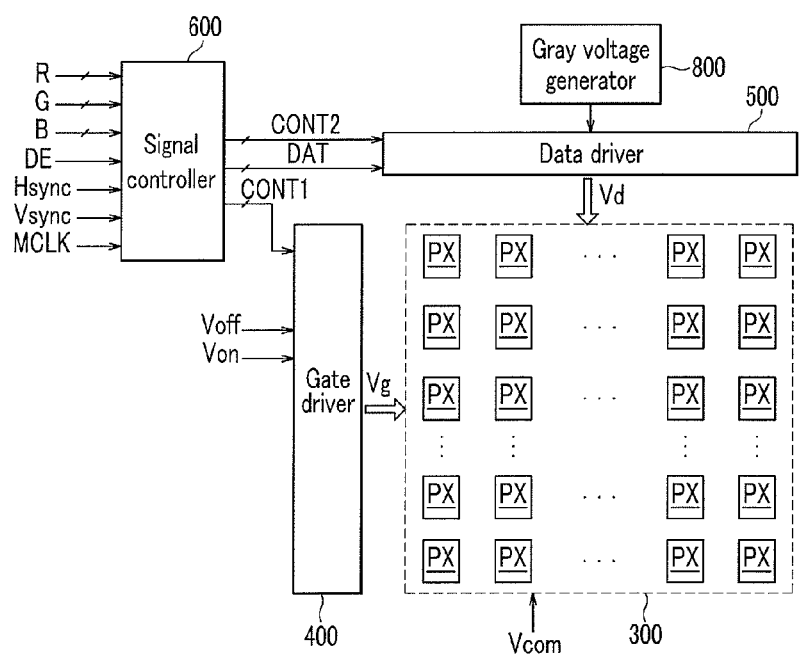
FIG. 1 is a block diagram of a liquid crystal display according to an exemplary embodiment of the present invention.

| 3: liquid crystal layer | 31: liquid crystal molecule |
|---|---|
| 100: lower panel | 110, 210: insulation substrate |
| 121: gate line | 124a, 124b: gate electrode |
| 131: storage electrode line | 137a, 137b: common voltage line |
| 140: gate insulating layer | 145a, 145b: contact hole |
| 154a, 154b: semiconductor | 163a, 165a: ohmic contact |
| 171: data line | 173a, 173b: source electrode |
| 175a, 175b, 177a, 177b: drain electrode | |
| 178: voltage line | 180: passivation layer |
| 185a, 185b: contact hole | 191a, 191b: pixel electrode |
| 200: upper panel | 220: light blocking member |
| 230: color filter | 250: overcoat |
| 300: liquid crystal panel assembly | 400: gate driver |
| 500: data driver | 600: signal controller |
| 800: gray voltage generator | PEa, PEb: pixel electrode |
| PX, PX1, PX2, PX3, PX4: pixel | |
| Qa, Qb: switching element, thin film transistor | |
| SL: storage electrode line | VL, VL1, VL2: voltage line |

DETAILED DESCRIPTION OF EXEMPLARY EMBODIMENTS

Exemplary embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., can be exaggerated for clarity. Like reference numerals designate like elements throughout the specification. It will be understood that when an element such as a layer, film, region, or substrate is referred to as being "on" another element, it can be directly on the other element or intervening elements may also be present.

Hereinafter, a liquid crystal display according to an exemplary embodiment of the present invention will be described in detail with reference to FIG. 1 and FIG. 2.

Figure 2:
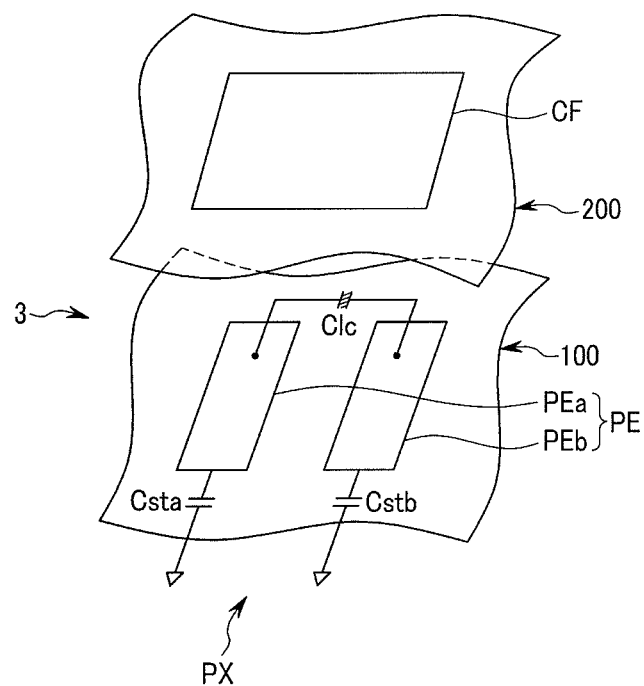
FIG. 2 is an equivalent circuit diagram showing a structure of a liquid crystal display and one pixel according to an exemplary embodiment of the present invention.

FIG. 1 is a block diagram of a liquid crystal display according to an exemplary embodiment of the present invention, and FIG. 2 is an equivalent circuit diagram showing a structure of a liquid crystal display and one-pixel according to an exemplary embodiment of the present invention.

Referring to FIG. 1, a liquid crystal display according to an exemplary embodiment of the present invention includes a liquid crystal panel assembly 300, a gate driver 400, a data driver 500, a gray voltage generator 800, and a signal controller 600.

The liquid crystal panel assembly 300 includes a plurality of signal lines (not shown) and a plurality of pixels PX connected thereto and arranged in an approximate matrix. Meanwhile, referring to FIG. 2, in a view of the structure, the liquid crystal panel assembly 300 includes lower and upper panels 100 and 200 facing each other, and a liquid crystal layer 3 therebetween.

The plurality of signal lines includes gate lines and data lines.

Referring to FIG. 2, each pixel PX includes a liquid crystal capacitor Clc, a first storage capacitor Csta, and a second storage capacitor Cstb.

The liquid crystal capacitor Clc includes the first pixel electrode PEa and a second pixel electrode PEb of the lower panel 100 as two terminals, and the liquid crystal layer 3 between the first and the second pixel electrodes PEa and PEb functions as a dielectric material. The first pixel electrode PEa and the second pixel electrode PEb may be connected to the signal lines through a separate switching element (not shown). The liquid crystal layer 3 has dielectric anisotropy and may be in a vertical alignment mode, in which the liquid crystal molecules of the liquid crystal layer 3 have their long axes aligned vertical to surfaces of the two panels 100 and 200 in the absence of an electric field.

The first and second pixel electrodes PEa and PEb of the pixel electrode PE may be formed from different layers, or from the same layer.

The first storage capacitor Csta and the second storage capacitor Cstb serving as assistants to the liquid crystal capacitor Clc may be respectively formed by overlapping separate electrodes (not shown) provided on the lower panel 100 with the first and second pixel electrodes PEa and PEb via an insulator interposed therebetween. The first and second storage capacitors Csta and Cstb may be omitted if necessary.

In addition, to realize a color display, each pixel PX uniquely displays one of primary colors (spatial division), or each pixel PX temporally and alternately displays one of the primary colors (temporal division). Then, the primary colors are spatially or temporally synthesized, and thus a desired color is recognized. An example of the primary colors may be red, green, and blue. One example of the spatial division is represented in FIG. 2, where each pixel PX is provided with a color filter (CF) for one of the primary colors on the region of the upper panel 200 corresponding to the first and second pixel electrodes PEa and PEb. Alternatively, the color filter CF may be formed on or below the first and second pixel electrodes PEa and PEb of the lower panel 100.

Referring again to FIG. 1, the gray voltage generator 800 generates all gray level voltages or a predetermined number, of gray level voltages (or reference gray level voltages) related to transmittance of the pixels PX.

The gate driver 400 is connected to the gate lines of the liquid crystal panel assembly 300, and applies a gate signal configured by a combination of a gate-on voltage Von and a gate-off voltage Voff to the gate lines.

The data driver 500 is connected to the data lines of the liquid crystal panel assembly 300, and selects a gray level voltage from the gray voltage generator 800 and applies the selected gray level voltage to the data line as the data voltage. However, in a case in which the gray voltage generator 800 provides a limited number of reference gray level voltages instead of all of the gray level voltages, the data driver 500 generates a desired data voltage by dividing the reference gray level voltages.

The signal controller 600 controls the gate driver 400 and the data driver 500.

Next, a method of driving a liquid crystal display according to an exemplary embodiment of the present invention will be described with reference to FIG. 3 as well as FIG. 1 and FIG. 2.

Figure 3:
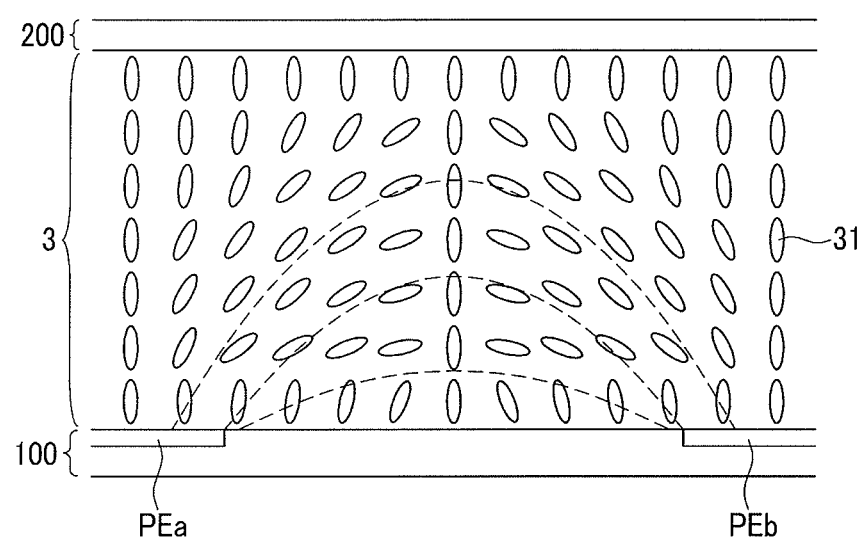
FIG. 3 is a schematic cross-sectional view of a liquid crystal display according to an exemplary embodiment of the present invention.

FIG. 3 is a cross-sectional view of a liquid crystal display according to an exemplary embodiment of the present invention. FIG. 3 shows the lower and upper panels 100 and 200 facing each other, the liquid crystal layer 3 therebetween, the first and second pixel electrodes PEa and PEb, and the liquid crystal molecules 31.

Referring to FIG. 1, the signal controller 600 receives input image signals R, G, and B and input control signals for controlling the input image signals from an external graphics controller (not shown). The input image signals R, G, and B contain a luminance value of the respective pixels PX, and the luminance value can have one of a predetermined number of gray values, for example $1024=2^{10}$, $256=2^8$, or $64=2^6$. The input control signals include vertical synchronization signals Vsync, horizontal synchronization signals Hsync, main clock signals MCLK, and data enable signals DE.

The signal controller 600, based on the received input image signals R, G, and B and the input control signals, processes the input image signals R, G, and B in accordance with the operating conditions of the liquid crystal panel assembly 300, and generates gate control signals CONT1, data control signals CONT2, and digital image signals DAT. Then, the signal controller 600 transmits the gate control signals CONT1 to the gate driver 400, while transmitting the data control signals CONT2 and the processed image signals DAT to the data driver 500.

Depending upon the data control signals CONT2 from the signal controller 600, the data driver 500 receives the digital image signals DAT for one row of pixels PX, and selects gray voltages corresponding to the respective digital image signals DAT, followed by converting the digital image signals DAT into analog data voltages Vd and applying them to the corresponding data lines.

Upon receipt of the gate control signals CONT1 from the signal controller 600, the gate driver 400 applies gate-on voltages Von to the gate lines to turn on the switching elements connected to the gate lines. Thus, the data voltage Vd applied to the data line is applied to the pixel electrode PE through the turned-on switching element. Here, only one of the first pixel electrode PEa and the second pixel electrode PEb may be supplied with the data voltage, and the other may be supplied with a predetermined voltage or may be periodically supplied with two voltages that oscillate.

The difference between the two data voltages applied to the first and second pixel electrodes PEa and PEb is expressed as a charged voltage of the liquid crystal capacitors Clc, i.e., a pixel voltage.

Figure 4:
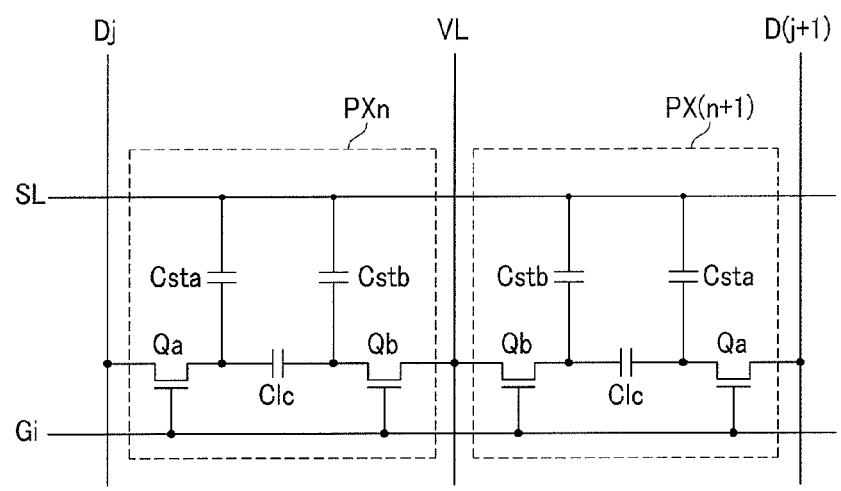
FIG. 4 and FIG. 5 are equivalent circuit diagrams of two pixels in a liquid crystal display according to an exemplary embodiment of the present invention.

If a potential difference is generated between two terminals of the liquid crystal capacitor Clc, as shown in FIG. 4, an electric field parallel to the surface of the display panel 100 and 200 is formed on the liquid crystal layer 3 between the first and second pixel electrodes PEa and PEb, as shown in FIG. 3. When the liquid crystal molecules 31 have a positive dielectric anisotropy, the liquid crystal molecules 31 arrange themselves such that the long axes thereof are aligned parallel to the direction of the electric field, and the degree of inclination changes according to the magnitude of the pixel voltage. This liquid crystal layer 3 is referred to as an electrically-induced optical compensation (EOC) mode liquid crystal layer. Also, the polarization of light passing through the liquid crystal layer 3 is changed according to the inclination degree of the liquid crystal molecules 31. The change of the polarization appears as a change of transmittance of light by the polarizer, and accordingly, the pixel PX displays the luminance representing the gray value of the image signal DAT.

By repeating such a process by one horizontal period (also referred to as "1H", equal to one period of the horizontal synchronization signal (Hsync) and the data enable signal DE), the gate-on signal Von is sequentially applied to all the gate lines and the data voltages are applied to all the pixels PX to display an image of one frame.

Next, a structure to apply a voltage to a pixel of a liquid crystal display according to an exemplary embodiment of the present invention will be described with reference to FIG. 4 and FIG. 5 as well as FIG. 1 to FIG. 3.

Figure 5:
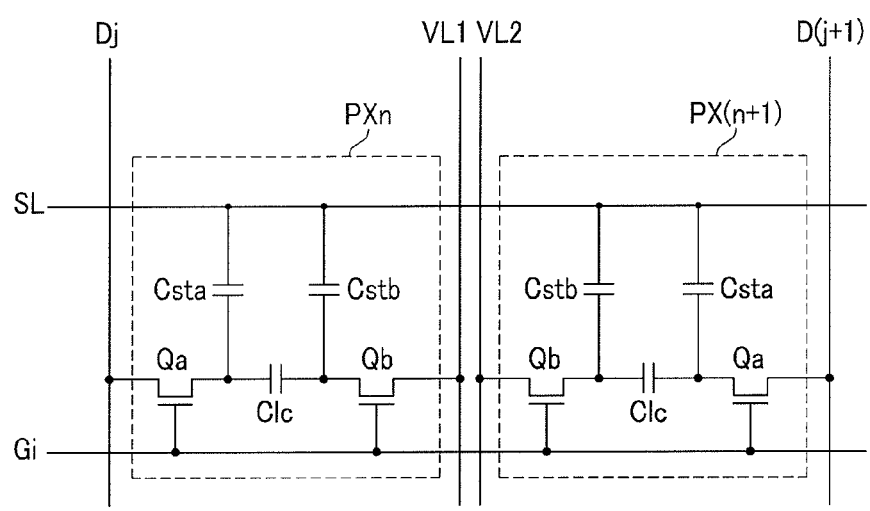

FIG. 4 and FIG. 5 are equivalent circuit diagrams of two pixels in a liquid crystal display according to an exemplary embodiment of the present invention.

Referring to FIG. 4, the liquid crystal display according to the present exemplary embodiment includes signal lines including a gate line Gi, a storage electrode line SL, neighboring data lines Dj and D(j+1), and a voltage line VL disposed between two data lines Dj and D(j+1), and pixels $PX_n$ and $PX_{n+1}$ connected thereto.

The gate line Gi transmits the gate signal, and the storage electrode line SL transmits a predetermined voltage such as a common voltage Vcom. The gate line Gi and the storage electrode line SL may be parallel to each other.

The data lines Dj and D(j+1) transmit the data voltage Vd from the data driver 500.

The voltage line VL is supplied with a predetermined voltage or is periodically supplied with two voltages that oscillate. For example, the voltage line VL may be periodically supplied with a lowest voltage and a highest voltage that are available to the liquid crystal display, and the oscillation period of the voltage may be one frame. The voltage line VL may receive the predetermined voltage or the two oscillating voltages from the data driver 500, via the data lines Dj and D(j+1). If the voltage from the data driver 500 is supplied to the voltage line VL, it may be useful for synchronizing the signal.

Each pixel PXn and PX(n+1) includes a first switching element Qa, a second switching element Qb, the liquid crystal capacitor Clc, the first storage capacitor Csta, and the second storage capacitor Cstb.

The first and second switching elements Qa and Qb may be three terminal elements such as a thin film transistor provided in the lower panel 100. The first switching element Qa of each pixel PXn and PX(n+1) includes a control terminal connected to the gate line Gi, an input terminal connected either to the data lines Dj or D(j+1), and an output terminal connected to the liquid crystal capacitor Clc and the first storage capacitor Csta. The second switching element Qb of each pixel PXn and PX(n+1), includes a control terminal connected to the gate line Gi, an input terminal connected to the voltage line VL, and an output terminal connected to the liquid crystal capacitor Clc and the second storage capacitor Cstb. The second switching elements Qb of two neighboring pixels PXn and PX(n+1) are connected to the same voltage line VL.

The description of the liquid crystal capacitor Clc and the first and the second storage capacitors Csta and Cstb is the same as the description of FIG. 2 such that it is omitted. However, in the exemplary embodiment shown in FIG. 4, the first and second storage capacitors Csta and Cstb are formed by respectively overlapping the first pixel electrode PEa and the second pixel electrode PEb, with the storage electrode line SL, via the insulator interposed therebetween.

In the exemplary embodiment shown in FIG. 5, instead of one voltage line VL, a first voltage line VL1 and a second voltage line VL2 are disposed between two neighboring pixels PXn and PX(n+1) such that the second switching element Qb of the pixels PXn and PX(n+1) are respectively connected to the first voltage line VL1 and the second voltage line VL2. The first and second voltage lines VL1 and VL2 may be supplied with one predetermined voltage, or may be periodically supplied with two oscillating voltages. Alternatively, the first voltage line VL1 and the second voltage line VL2 may be periodically supplied with the different voltages that oscillate for the frame. As described above, the voltages may be the lowest voltage and the highest voltage available to the liquid crystal display.

Next, an operation of the liquid crystal display shown in FIG. 4 will be described with reference to FIG. 6 and FIG. 7.

Figure 6:
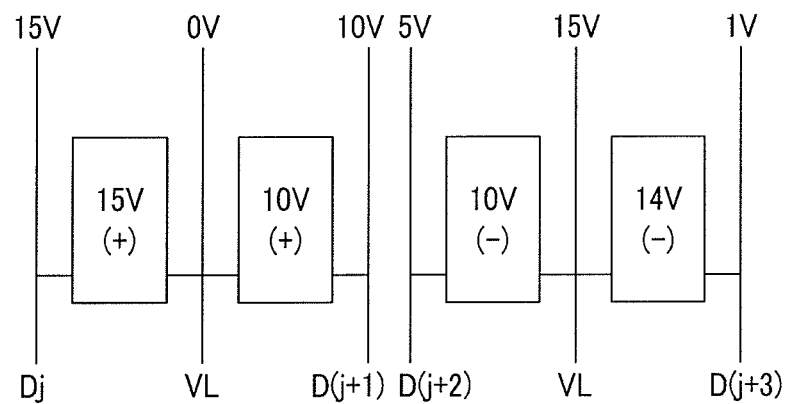
FIG. 6 and FIG. 7 depict a charging voltage of a liquid crystal capacitor and a data voltage applied to a data line of four neighboring pixels in two sequential frames when an available lowest voltage is 0V and an available highest voltage is 15V in a liquid crystal display according to an exemplary embodiment of the present invention.
Figure 7:
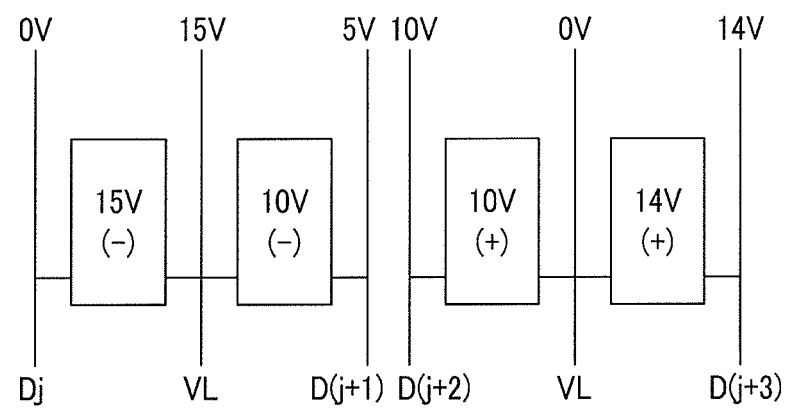

FIG. 6 and FIG. 7 depict a charging voltage of a liquid crystal capacitor and a data voltage applied to a data line of four neighboring pixels in two sequential frames when an available lowest voltage is 0V and an available highest voltage is 15V in a liquid crystal display according to an exemplary embodiment of the present invention.

Referring to FIG. 6 and FIG. 7, one voltage line VL is disposed between two neighboring pixels, and two pixels PX are commonly connected to the voltage line VL. The voltage line VL is periodically supplied with the highest driving voltage (e.g., 15V) and the lowest driving voltage (e.g., 0V) by frame, and two neighboring voltage lines VL are supplied with different voltages. That is, if the voltage line VL is supplied with 0V in one frame as shown in FIG. 6, the voltage line VL is supplied with 15V in the next frame as shown in FIG. 7, and the neighboring voltage lines VL is supplied with the reverse voltage.

The data voltages applied to the data lines Dj, D(j+1), D(j+2), and D(j+3) may be the highest driving voltage, the lowest driving voltage, or voltages therebetween.

First, referring to FIG. 6, when the left voltage line VL is supplied with 0V and the right voltage line VL is supplied with 15V, the target charging voltage of the first pixel is 15V, such that the first data line Dj is supplied with the data voltage of 15V, and the target charging voltage of the second pixel is 10V such that the second data line D(j+1) is supplied with 10V. The target charging voltage of the third pixel is 10V such that the third data line D(j+2) is supplied with 5V, and the target charging voltage of the fourth pixel is 14V such that the fourth data line D(j+3) is supplied with 1V. Here, the two left pixels are supplied with a data voltage having a positive polarity and two right pixels are supplied with a data voltage of a negative polarity with respect to the voltage of the voltage line VL such that it is possible to drive by column inversion, and thereby improve display characteristics.

In the next frame, as shown in FIG. 7, the left voltage line VL is supplied with 15V, and the right voltage line VL is supplied with 0V. The target charging voltage of the first pixel is 15V such that the first data line Dj is supplied with the data voltage of 0V, and the target charging voltage of the second pixel is 1.0V such that the second data line D(j+1) is supplied with 5V. The target charging voltage of the third pixel is 10V such that the third data line D(j+2) is supplied with 10V, and the target charging voltage of the fourth pixel is 14V such that the fourth data line D(j+3) is supplied with 14V. Here, two left pixels are supplied with a data voltage having a negative polarity and two right pixels are supplied with a data voltage having a positive polarity with respect to the voltage of the voltage line VL such that it is possible to drive by column inversion, and since the opposite polarity was applied to the previous frame, driving by frame inversion is realized.

In the exemplary embodiments of FIG. 6 and FIG. 7, the values of the target charging voltage of the pixel and the voltage applied to the voltage line VL are exemplary, and may vary according to the liquid crystal display.

In the present exemplary embodiment, the voltage line VL that is shared by two pixels is disposed between two neighboring pixels, such that the number of data lines may be reduced, the aperture ratio and the transmittance of the liquid crystal display may be increased, and the number of data drivers may be reduced. Therefore, the manufacturing cost of the liquid crystal display may be reduced.

Also, two pixel electrodes of one pixel PX are supplied with voltages having different polarities with respect to the common voltage Vcom that is substantially between the highest driving voltage and the lowest driving voltage, such that the driving voltage may be increased, the response speed of the liquid crystal molecule may be increased, and the transmittance of the liquid crystal display may be increased.

Next, an inversion driving method of a liquid crystal display according to an exemplary embodiment of the present invention will be described with reference to FIG. 8.

Figure 8:
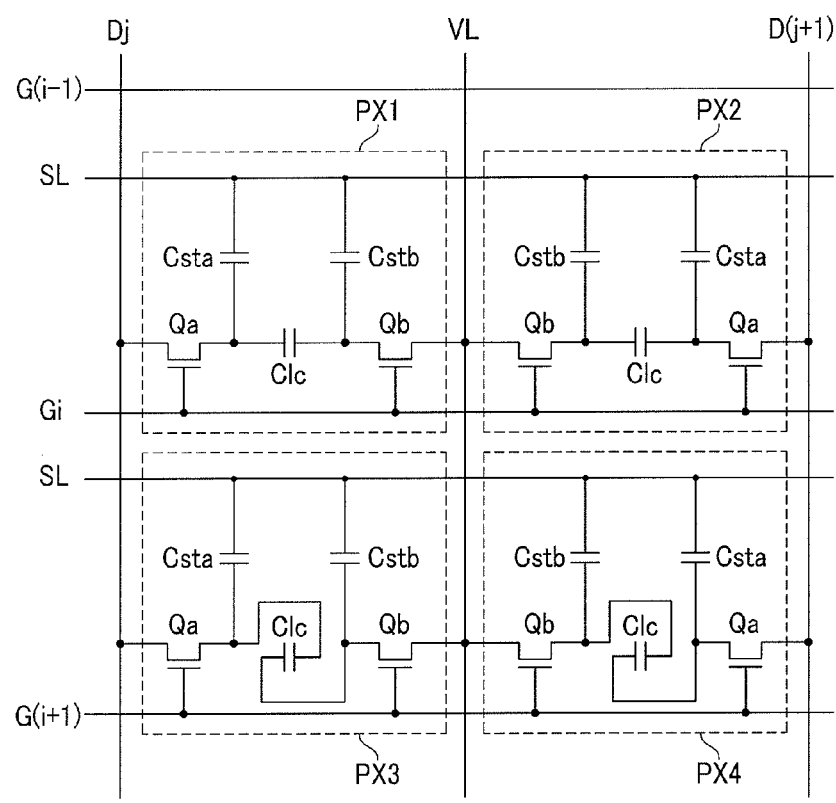
FIG. 8 is an equivalent circuit diagram of four pixels of a liquid crystal display according to an exemplary embodiment of the present invention.

FIG. 8 is an equivalent circuit diagram of four pixels of a liquid crystal display according to an exemplary embodiment of the present invention, Referring to FIG. 8, a circuit of four pixels PX1, PX2, PX3, and PX4 that neighbor each other in the row direction and the column direction is Shown. The connection relationship of two pixels PX1 and PX2 that neighbor in the row direction is the same as that of the exemplary embodiment shown in FIG. 4 such that the detailed description thereof is omitted.

However, the connection relationship of the liquid crystal capacitor Clc, and the first and second switching elements Qa and Qb of two pixels PX3 and PX4, is different from that of the pixels PX1 and PX2. Referring to the left terminal of the liquid crystal capacitor Clc as the first terminal and the right terminal as the second terminal, the first switching element Qa of the pixels PX1 and PX2 are connected to the first terminal of the liquid crystal capacitor Clc, the second switching element Qb is connected to the second terminal of the liquid crystal capacitor Clc. On the other hand, the first switching element Qa of the pixels PX3 and PX4 is connected to the second terminal of the liquid crystal capacitor Clc, and the second switching element Qb thereof is connected to the first terminal of the liquid crystal capacitor Clc.

Thus, although the voltage line VL is supplied with the same voltage during one frame, row inversion driving is possible.

Next, the pixel structure and liquid crystal display arrangement shown in FIG. 8 will be described with reference to FIG. 9 to FIG. 1.3.

Figure 9:
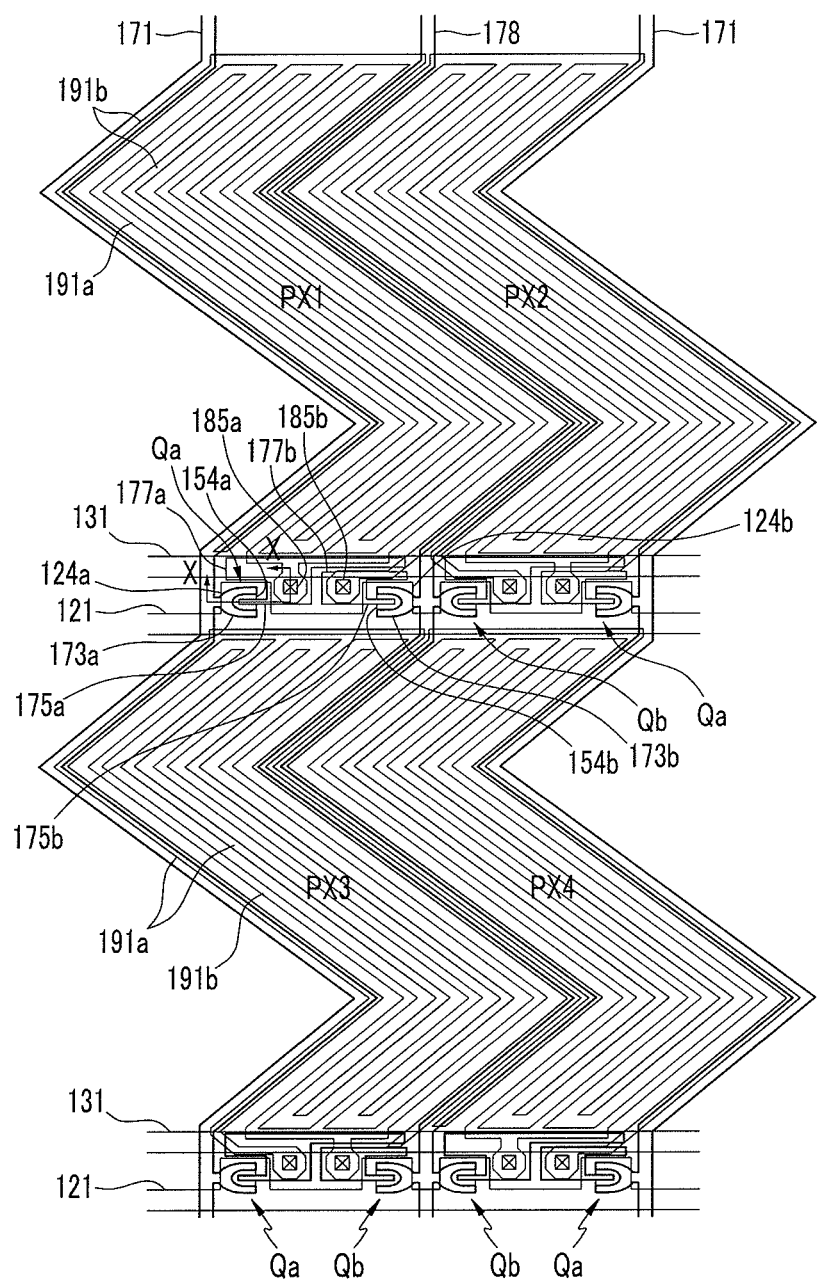
FIG. 9 is a layout view of four pixels of a liquid crystal display according to an exemplary embodiment of the present invention.
Figure 10:
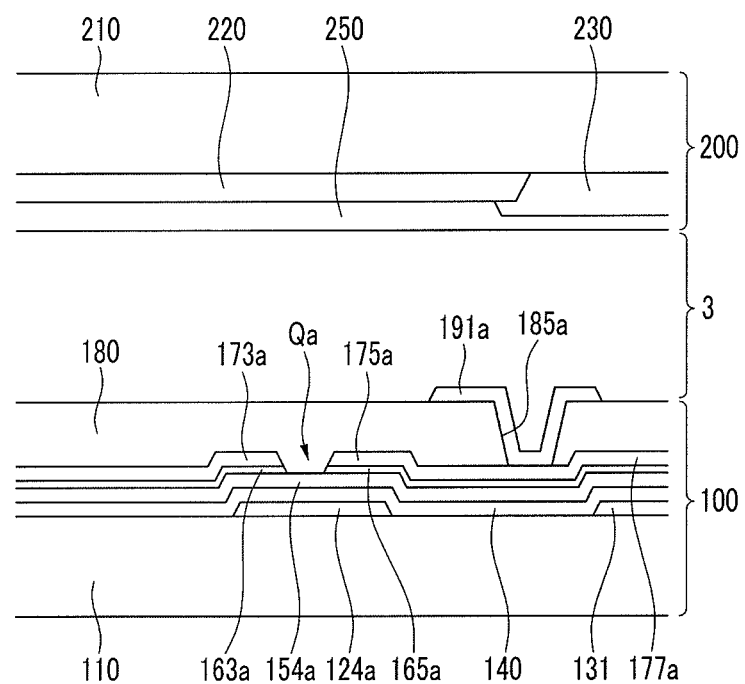
FIG. 10 is a cross-sectional view of the liquid crystal display of FIG. 9 taken along the line X-X.

FIG. 9 is a layout view of four pixels of a liquid crystal display according to an exemplary embodiment of the present invention, and FIG. 10 is a cross-sectional view of the liquid crystal display of FIG. 9 taken along the line X-X.

Referring to FIG. 9 and FIG. 10, a liquid crystal display according to an exemplary embodiment of the present invention includes lower and upper display panels 100 and 200 facing each other, and a liquid crystal layer 3 interposed between the two panels 100 and 200.

First, the lower display panel 100 will be described in detail.

A plurality of gate conductors including a plurality of gate lines 121, and a plurality of storage electrode lines 131 are formed on an insulation substrate 110.

The gate lines 121 transmit gate signals and extend in a transverse direction, and each gate line 121 includes a plurality of pairs of first and second gate electrodes 124a and 124b.

The storage electrode line 131 receives a predetermined voltage such as a common voltage Vcom, and extends in the transverse direction. Each storage electrode line 131 may be disposed above a neighboring gate line 121, and may include a downward protrusion.

A gate insulating layer 140 that may be made of silicon nitride (SiNx) or silicon oxide (SiOx) is formed on the gate conductors 121 and 131.

A plurality of first semiconductor stripes (not shown) and a plurality of second semiconductor stripes (not shown) respectively disposed between pairs of first semiconductor stripes are formed on the gate insulating layer 140, and they may be made of hydrogenated amorphous silicon or polysilicon. The first semiconductor stripe includes protrusions 154a protruding on the left or right side to be disposed on the first gate electrode 124a, and the second semiconductor stripe includes protrusions 154b protruding on both of the right and left sides to be disposed on the second gate electrodes 124b.

Ohmic contacts 163a and 165a are formed on the first and the second semiconductor stripes. The ohmic contacts 163a and 165a may be made of a material such as n+hydrogenated a-Si that is heavily doped with an n-type impurity such as phosphorus, or of a silicide. The ohmic contacts 163a and 165a are separated from each other on the first and second gate electrodes 124a and 124b.

A data conductor including a plurality of pairs of data lines 171, a plurality of voltage lines 178, and a plurality of pairs of first and second drain electrodes 175a and 175b are formed on the ohmic contacts 163a and 165a and the gate insulating layer 140.

The data line 171 transmits the data signal and extends substantially in the longitudinal direction. As shown in FIG. 9, the data line 171 may be periodically curved with a zigzag shape, and there may be a plurality of curves. The acute angle between the oblique edge of the data line 171 and the gate line 121 may be about 45 degrees. The data line 171 includes a first source electrode 173a extending toward the first gate electrodes 124a and 124b.

The voltage line 178 is disposed between the pair of data lines 171, and transmits a predetermined voltage, or alternatively, transmits two voltages that periodically oscillate. The voltage line 178 extends in the longitudinal direction like the data line 171, as shown in FIG. 9, may be curved parallel to the data line 171 with the zigzag shape. The acute angle between the oblique edge of the voltage line 178 and the gate line 121 may be about 45 degrees. The voltage line 178 includes second source electrodes 173b extending in both sides toward the second gate electrodes 124b. The first source electrode 173a and the second source electrode 173b face each other with mirror symmetry.

The first drain electrode 175a includes a bar-shaped end portion and a first extension 177a having a wide area, and the second drain electrode 175b includes a bar-shaped end portion and a second extension 177b having a wide area. The bar-shaped end portions of the first and second drain electrodes 175a and 175b are respectively opposite to the first and second source electrodes 173a and 173b with respect to the first and second gate electrodes 124a and 124b, and are partially enclosed by the first and second source electrodes 173a and 173b. Most of the first and second expansions 177a and 177b overlap the storage electrode line 131.

The first and second gate electrodes 124a and 124b, the first and second source electrodes 173a and 173b, and the first and second drain electrodes 175a and 175b respectively constitute the first and second thin film transistors Qa and Qb together with the first and second semiconductors 154a and 154b. Channels of the first and second thin film transistors Qa and Qb are respectively formed in the first and second semiconductors 154a and 154b between the first and second source electrodes 173a and 173b and the first and second drain electrodes 175a and 175b.

The protrusions 154a and 154b of the semiconductor have a portion that is exposed without being covered by the first and second source electrodes 173a and 173b and the first and second drain electrodes 175a and 175b.

A passivation layer 180 made of an inorganic insulator or an organic insulator is formed on the data conductors 173a, 173b, 175a, and 175b, and the exposed protrusions 154a and 154b of the semiconductors.

The passivation layer 180 has a plurality of contact holes 185a and 185b exposing portions of the first and second extensions 177a and 177b.

A plurality of pairs of first and second pixel electrodes 191a and 191b that may be made of a transparent conductive material such as indium tin oxide (ITO) or indium zinc oxide (IZO), or a reflective metal such as aluminum, silver, chromium, or alloys thereof, are formed on the passivation layer 180.

As shown in FIG. 9, the first and second pixel electrodes 191a and 191b include a plurality of branches that are interposed between each other with a substantially uniform gap, and the plurality of branches are substantially parallel to the data lines 171 and the voltage line 178. The plurality of branches may be curved with the zigzag shape like the data line 171 and the voltage line 178 as shown in FIG. 9, and may form an acute angle of about 45 degrees with the gate line 121. The branches of the first pixel electrode 191a and the second pixel electrode 191b are alternately disposed, thereby forming a pectinate pattern.

The first and second pixel electrodes 191a and 191b are respectively physically and electrically connected to the first and second drain electrodes 175a and 175b through the contact holes 185a and 185b. The first and second pixel electrodes 191a and 191b respectively receive data voltages from the first and second drain electrodes 175a and 175b. The first and second pixel electrodes 191a and 191b along with the liquid crystal layer 3 form the liquid crystal capacitor Clc which maintains the applied voltage after the first and second thin film transistors Qa and Qb are turned off.

The first and second expansions 177a and 177b of the first and second drain electrodes 175a and 175b that are connected to the first and second pixel electrodes 191a and 191b overlap the storage electrode line 131 via the gate insulating layer 140, thereby respectively forming the first and second storage capacitors Csta and Cstb that enhance the voltage maintaining capacity of the liquid crystal capacitor Clc.

Referring to FIG. 8 and FIG. 9, for the pixels PX1 and PX3, or PX2 and PX4 neighbor each other in the column direction, the sequence in which the branches of the first and second pixel electrodes 191a and 191b are positioned in the region where light is transmitted is different. That is, the branches of the second pixel electrode 191b of the pixels PX1 and PX2 disposed in the upper row form the outer boundary of the pixels PX1 and PX2, and are disposed ahead of the first pixel electrode 191a. On the other hand, the branches of the first pixel electrode 191a form the outer boundary of the pixels PX3 and PX4 in disposed in the lower row, and are disposed ahead of the second pixel electrode 191b. As described above, the arrangement sequence of the branches of the first pixel electrode 191a and the second pixel electrode 191b of the pixels neighboring in the column direction are reversed, and as a result, as shown in FIG. 8, row inversion driving may be realized with respect to the voltage line 178 supplied with a voltage that oscillates by frame.

Next, referring to the upper panel 200, light blocking member 220 and a plurality of color filters 230 are formed on an insulation substrate 210. The light blocking member 220 blocks light leakage between the first and second pixel electrodes 191a and 191b. The color filter 230 is primarily disposed in the region enclosed by the light blocking member 220, and may extend along the columns of the first and second pixel electrodes 191a and 191b.

An overcoat 250 is formed on the color filter 230 and the light blocking member 220. The overcoat 250 may be made of an (organic) insulating material, and protects the color filters 230 and provides a flat surface. The overcoat 250 may be omitted.

Vertical alignment layers (not shown) may be formed on the inner surface of the display panels 100 and 200.

Polarizers (not shown) may be provided on the outer surface of the display panels 100 and 200.

If the first and second pixel electrodes 191a and 191b are supplied with voltages through the data line 171 and the voltage line 178, an electric field approximately parallel to the surface of the display panels 100 and 200 is formed. Thus, the liquid crystal molecules of the liquid crystal layer 3 that are initially aligned perpendicular to the surfaces of the display panels 100 and 200 rearrange themselves in response to the electric field such that the long axes thereof are inclined parallel to the direction of the electric field, and the polarization degree of the light incident to the liquid crystal layer 3 varies according to the inclination degree of the liquid crystal molecules. The change of polarization appears as a change of transmittance by the polarizer, by which the liquid crystal display displays the images.

In the present exemplary embodiment, the first and second pixel electrodes 191a and 191b curve with a zigzag shape to vary the inclination direction of the liquid crystal molecules, and thereby improve the viewing angle. In addition, the exemplary embodiment of FIG. 9 may also incorporate characteristics and effects of the exemplary embodiments described above.

Figure 11:
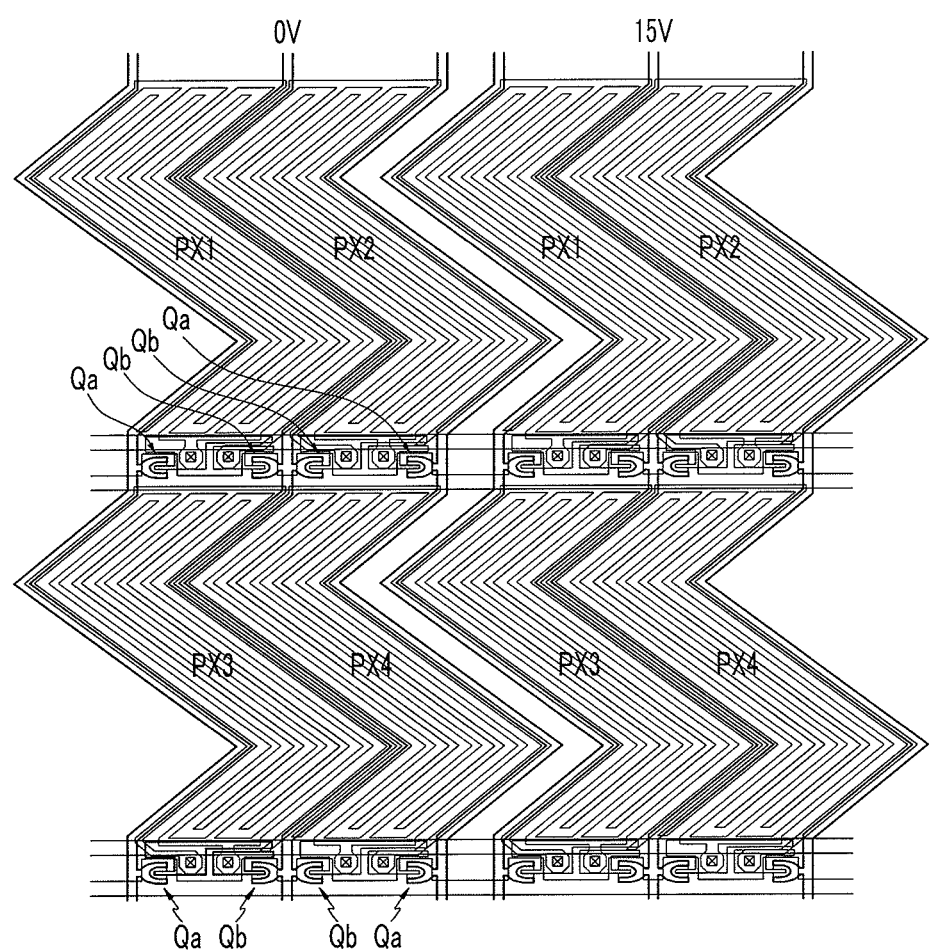
FIG. 11, FIG. 12, and FIG. 13 are layout views of a plurality of pixels of a liquid crystal display according to an exemplary embodiment of the present invention.
Figure 13:
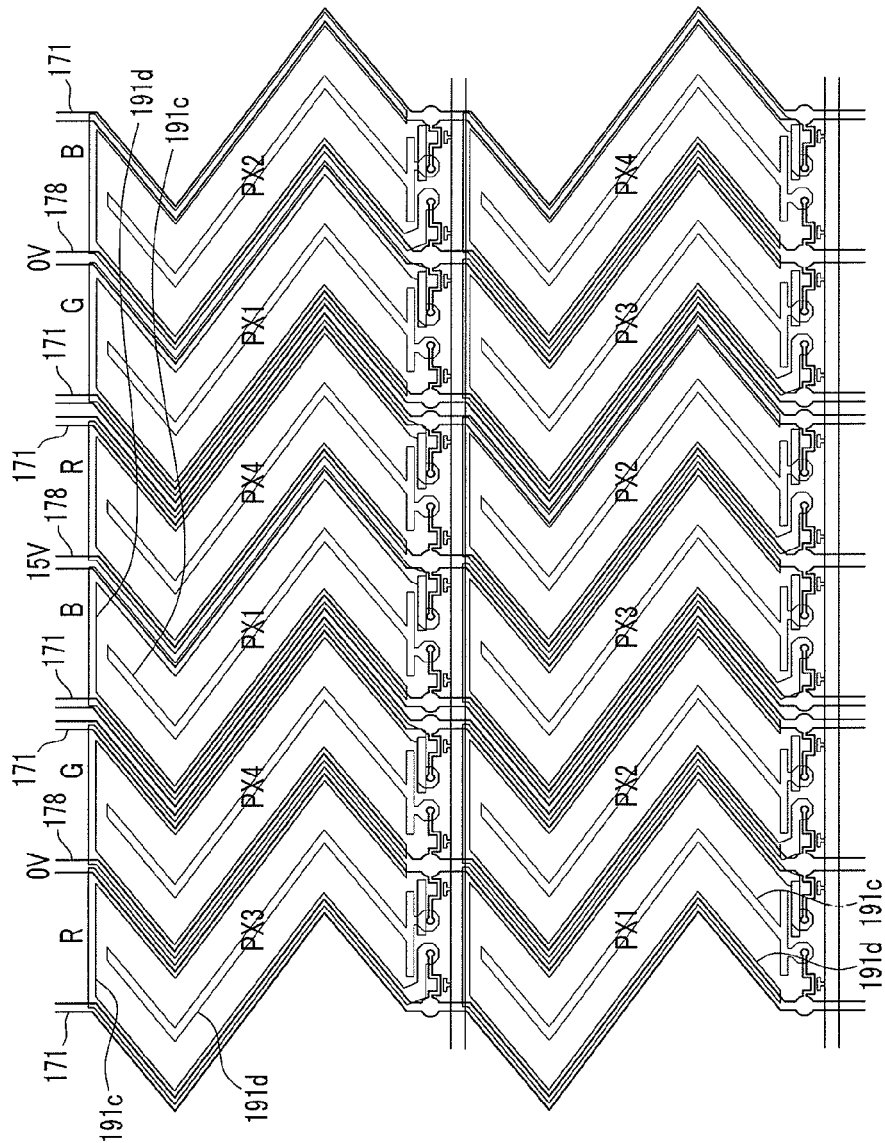

FIG. 11, FIG. 1.2, and FIG. 13 are layout views of a plurality of pixels of a liquid crystal display according to an exemplary embodiment of the present invention.

Referring to FIG. 11, the pixels shown in FIG. 9 are consecutively disposed in a row direction. That is, the two pixels PX1 and PX2 are alternately disposed in the upper row of the pixel, and the two pixels PX3 and PX4 are alternately disposed in the lower row of the pixel. On the other hand, the two neighboring voltage lines 178 are supplied with different voltages, for example 0V and 15V. As described above, as shown in FIG. 6 and FIG. 7, the polarities of the data voltages applied to the neighbor pixel pair PX1 and PX2 in each pixel row are reversed, to realize column inversion. Also, the voltage applied to each voltage line 178 may oscillate by frame, to realize frame inversion as described regarding FIG. 6 and FIG. 7.

Figure 12:
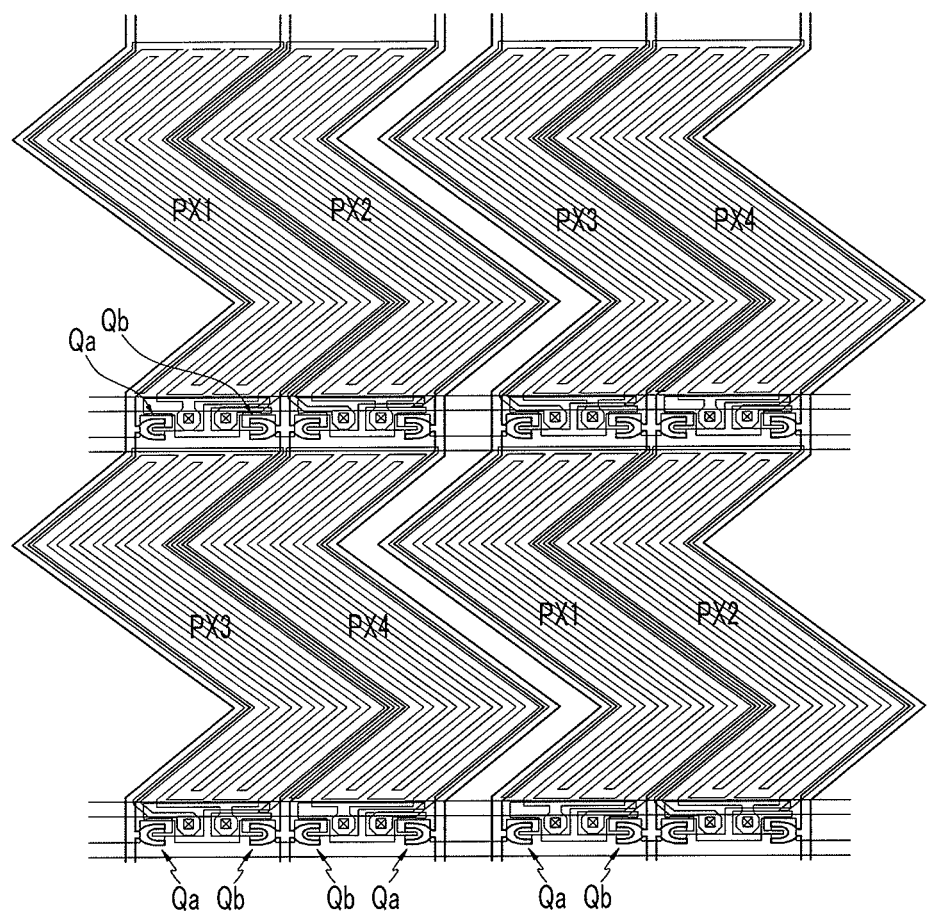

Next, referring to FIG. 12, a pair of pixels PX1 and PX2, and a pair of pixels PX3 and PX4 are alternately disposed in one pixel row. That is, a pair of pixels including the pixels PX1 and PX2 neighbor the pair of pixels including the pixels PX3 and PX4. Pixels PX3 and PX4 have first and second pixel electrodes 191a and 191b whose branch arrangement is reversed with respect to the branch arrangement of the first and second pixel electrodes 191a and 191b of the pixels PX1 and PX2. Here, two neighboring voltage lines 178 may be supplied with the same voltage, for example 0V and 15V. Although the voltage line 178 between the pixel pair PX1 and PX2 and the voltage line 178 between the pixel pair PX3 and PX4 neighboring in the row direction are supplied with the same voltage, the branch arrangements of the first and second pixel electrodes 191a and 191b of the two pixel pairs are reversed with respect to each other, to realize column inversion.

Next, FIG. 13 shows another arrangement of the pixels PX1, PX2, PX3, and PX4, each having first and second pixel electrodes 191c and 191d, according to an embodiment of the invention. In this exemplary embodiment, the number of the branches of each of the pixel electrodes 191c and 191d is reduced by two with respect to the number of branches of the first and second pixel electrodes 191a and 191b of the exemplary embodiment of FIG. 11 and FIG. 1.2. The voltage lines 178 are alternately supplied with the highest driving voltage (e.g., 15V) and the lowest driving voltage (e.g., 0V) in the row direction. The pixels R, G, and B representing red (R), green (G), and blue (B) are alternately disposed in the row direction, and, as shown in FIG. 9, pixels PX1 and PX3, and PX2 and PX4, for which the branch arrangement of the first and second pixel electrodes 191c and 191d are reversed, are disposed as neighbors in the column direction.

When the pixels PX1, PX2, PX3, and PX4 are disposed like this, and the pixels representing the red (R), the green (G), and the blue (B) are grouped into one pixel group, the polarities of the pixel groups neighboring in the row direction are different and the polarities of the pixel groups neighboring in the column direction are also different, thereby realizing dot inversion.

Next, a structure for supplying a voltage to an edge portion of the liquid crystal display, particularly the voltage line 178, will be described with reference to FIG. 14 and FIG. 15, as well as FIG. 1.

Figure 14:
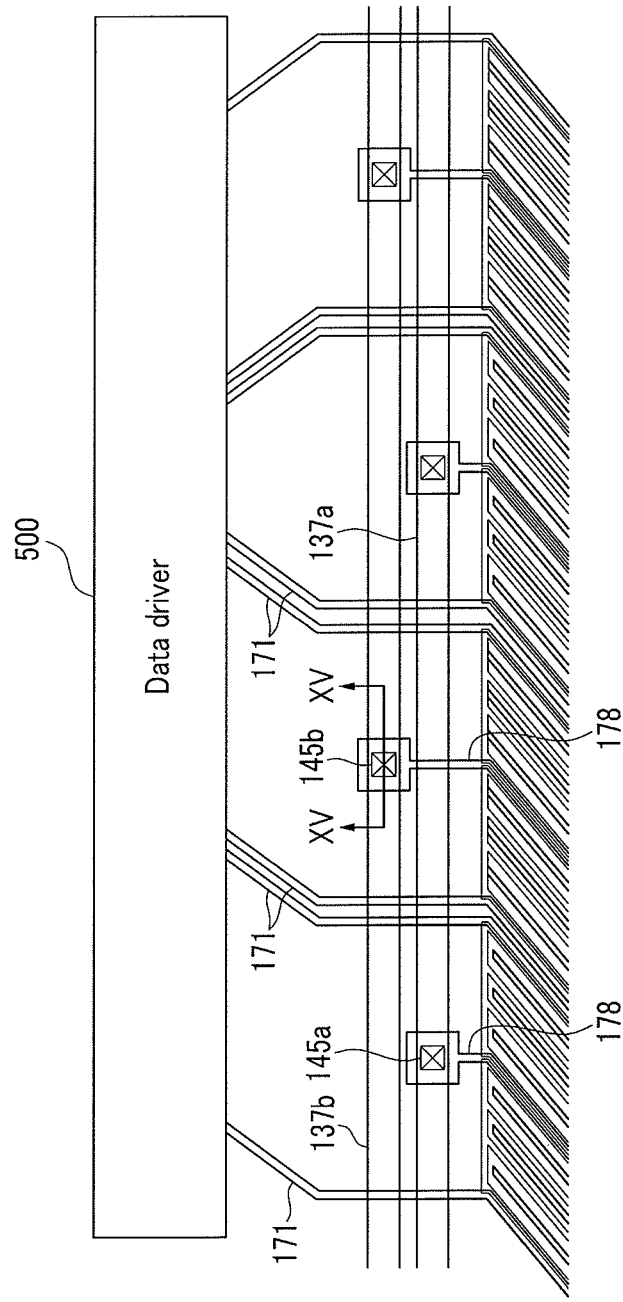
FIG. 14 is a layout view of an edge portion of a liquid crystal display according to an exemplary embodiment of the present invention.
Figure 15:
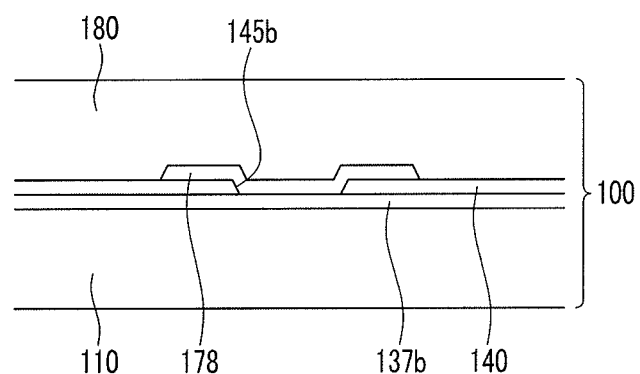
FIG. 15 is a cross-sectional view of the liquid crystal display of FIG. 14 taken along the line XV-XV.

FIG. 14 is a layout view of an edge portion of a liquid crystal display according to an exemplary embodiment of the present invention, and FIG. 15 is a cross-sectional view of the liquid crystal display of FIG. 14 taken along the line XV-XV.

The liquid crystal display whose cross-sectional edge portion is shown in FIG. 14 and FIG. 15 is similar to the liquid crystal display according to the exemplary embodiment shown in FIG. 9 and FIG. 10.

Referring to the lower panel 100, a first common voltage line 137a and a second common voltage line 137b are formed on the insulation substrate 110. Referring to FIG. 1 and FIG. 14, the first and second common voltage lines 137a and 137b extend in the row direction between the pixels PX 300 and the data driver 500, and are both insulated from and cross the data line 171. The first common voltage line 137a and the second common voltage line 137b may transmit two different voltages, for example the highest driving voltage and the lowest driving voltage. Also, the voltages of the first and second common voltage lines 137a and 137b may change by frame, and may oscillate.

A gate insulating layer 140 is formed on the first and the second common voltage line 137a and 137b. The gate insulating layer 140 includes a plurality of substantially uniformly arranged contact holes 145a that expose a portion of the first common voltage line 137a, and a plurality of substantially uniformly arranged contact holes 145b that expose a portion of the second common voltage line 137b.

A voltage line 178 is disposed on the gate insulating layer 140, and a semiconductor (not shown) having the same plane shape as the voltage line 178 may be formed between the gate insulating layer 140 and the voltage line 178. Since the description thereof is the same as that of the above exemplary embodiment, it is omitted.

The voltage line 178 is alternately connected to the first common voltage line 137a and the second common voltage line 137b through the contact holes 145a and the contact holes 145b in a row direction, thereby receiving the voltage.

Alternatively, one of the first and second common voltage lines 137a and 137b may be omitted, and in this case, all of the voltage lines 178 may be connected to one common voltage line. Also, the first and second common voltage lines 137a and 137b may be formed from different layers than that of the present exemplary embodiment, for example, may be formed from the same layer as the data line 171. In this case, the contact holes 145a and 145b of the gate insulating layer 140 are unnecessary, and the voltage line 178 may be directly connected to the first and second common voltage lines 137a and 137b.

A passivation layer 180 is formed on the voltage line 178 and the gate insulating layer 140.

According to an exemplary embodiment of the present invention, a pixel voltage range capable of being used in the liquid crystal display may be increased without replacing the data driver, thereby increasing the transmittance. Also, the manufacturing cost of the driver may be reduced, and the aperture ratio of the display panel may be improved.

Also, according to an exemplary embodiment of the present invention, row inversion, column inversion, or dot inversion driving may be realized without inversion driving in the data driver.

While embodiments of this invention have been described in connection with what is presently considered to be practical exemplary embodiments, it is to be understood that embodiments of the invention are not limited to the disclosed exemplary embodiments, but, on the contrary, are intended to cover various modifications and equivalent arrangements included within the spirit and scope of the appended claims.

What is claimed is:

1. A liquid crystal display comprising:
a first substrate,
a first pixel and a second pixel that neighbor each other in a row direction, wherein the first and second pixels are formed on the first substrate;
a first data line and a second data line formed on the first substrate and respectively transmitting a data voltage; and
a first voltage line disposed between the first data line and the second data line,
wherein each of the first pixel and second pixel includes
a first switching element connected either to the first data line or the second data line,
a second switching element connected to the first voltage line,
a first pixel electrode connected to the first switching element and including a plurality of branches, and
a second pixel electrode connected to the second switching element and including a plurality of branches, wherein the branches of the first pixel electrode and the branches of the second pixel electrode are alternately arranged and form a liquid crystal capacitor, and
a position of the first pixel electrode with respect to the second pixel electrode of the first pixel is opposite to a position of the first pixel electrode with respect to the second pixel electrode of the second pixel.

2. The liquid crystal display of claim 1, wherein the first data line, the second data line, the first voltage line, and the branches of the first pixel electrode and the second pixel electrode are periodically curved with a zigzag shape.

3. The liquid crystal display of claim 1, wherein the first voltage line is supplied with two different voltages alternately by frame.

4. The liquid crystal display of claim 2, further comprising a second voltage line extending parallel to the first voltage line,
wherein the second voltage line is supplied with a different voltage from the first voltage line.

5. The liquid crystal display of claim 4, farther comprising a first common voltage line disposed on an edge portion of the first substrate and intersecting the first and second data lines,
wherein the first voltage line is connected to the first common voltage line, thereby receiving a voltage.

6. The liquid crystal display of claim 5, further comprising a second common voltage line disposed on an edge portion of the first substrate and intersecting the first and second data lines,
wherein the second voltage line is connected to the second common voltage line, thereby receiving a voltage.

7. The liquid crystal display of claim 6, further comprising a data driver respectively applying a data voltage to the first data line and the second data line,
wherein the first voltage line and the second voltage line respectively receive a voltage from the data driver.

8. The liquid crystal display of claim 1, further comprising a second substrate facing the first substrate, and
a liquid crystal layer interposed between the first substrate and the second substrate,
wherein the liquid crystal layer has a positive dielectric anisotropy.

9. The liquid crystal display of claim 2, further comprising a third pixel and a fourth pixel respectively neighboring the first pixel and the second pixel in a column direction, said third and fourth pixels formed on the substrate, the third and fourth pixels respectively including
a first switching element connected to the first data line or the second data line,
a second switching element connected to the first voltage line,
a first pixel electrode connected to the first switching element, and
a second pixel electrode connected to the second switching element.

10. The liquid crystal display of claim 9, wherein
the branches of the first pixel electrode and the branches of the second pixel electrode are interposed between each other, and
a branch arrangement sequence of the first pixel electrode and the second pixel electrode in the first pixel is opposite to a branch arrangement sequence of the first pixel electrode and the second pixel electrode in the third pixel.

11. A liquid crystal display comprising:
a first substrate,
a first data line and a second data line formed on the first substrate, each data line respectively transmitting a data voltage;
a first voltage line disposed between the first data line and the second data line; and
a first pixel, second pixel, third pixel and fourth pixel arranged in a matrix-like array on said first substrate, each pixel including a liquid crystal capacitor,
a first switching element connected to the liquid crystal capacitor and either the first data line or the second data line,
a second switching element connected to the liquid crystal capacitor and the first voltage line,
a first pixel electrode connected to the first switching element, and a second pixel electrode connected to the second switching element, the first pixel electrode and the second pixel electrode respectively include a plurality of branches, and the branches of the first pixel electrode and the branches of the second pixel electrode are alternately interposed with each other.

12. The liquid crystal display of claim 11, wherein
an arrangement sequence of the branches of the first pixel electrode and the branches of the second pixel electrode in the first pixel is opposite to an arrangement sequence of the branches of the first pixel electrode and the branches of the second pixel electrode in the third pixel.

13. The liquid crystal display of claim 12, wherein the branches of the first pixel electrode and the branches of the second pixel electrode are substantially periodically curved with a zigzag shape, and the first data line, the second data line, and the first voltage line are substantially periodically curved with a zigzag shape according to the first pixel electrode and the second pixel electrode.

14. The liquid crystal display of claim 11, wherein the first switching element of first and second pixels that are neighboring row pixels is connected to a first terminal of the liquid crystal capacitor, the second switching element of the first and second neighboring row pixels is connected to the second terminal of the liquid crystal capacitor, the first switching element of third and fourth pixels that are neighboring row pixels is connected to the second terminal of the liquid crystal capacitor, and the second switching element of the third and fourth neighboring row pixels is connected to the first terminal of the liquid crystal capacitor, and the third and fourth pixels respectively neighbor the first and second pixels in a column direction.

15. The liquid crystal display of claim 11, wherein branches of the second pixel electrode of the first and second pixels disposed in an upper row form an outer boundary of the first and second pixels and are disposed ahead of the first pixel electrode,
branches of the first pixel electrode form an outer boundary of the third and fourth pixels disposed in the lower row, and are disposed ahead of the second pixel electrode, wherein row inversion driving may be realized when the first voltage line is supplied with a voltage that oscillates by frame.

16. The liquid crystal display of claim 11, further comprising a second voltage line disposed between the first data line and the second data line extending parallel to the first voltage line.

17. The liquid crystal display of claim 16, wherein the first and second pixels are alternately disposed in an upper row of the pixel, the third and fourth pixels are alternately disposed in a lower row of the pixel, the polarities of the data voltages applied to the first and second neighbor pixel pair in each pixel row are reversed to realize column inversion, wherein the second voltage line is supplied with a different voltage from the first voltage line and the voltage applied to the first and second voltage lines oscillates by frame to realize frame inversion.

18. The liquid crystal display of claim 16, wherein said first and second pixels and said third and fourth pixels are alternately disposed in one pixel row, wherein the first and second pixel electrodes of said third and fourth pixels have a branch arrangement that is reversed with respect to the branch arrangement of the first and second pixel electrodes of the first and second pixels, the first and second voltage lines are supplied with a same voltage, and the branch arrangements of the first and second pixel electrodes of the first and second pixels are reversed with respect to branch arrangements of the first and second pixel electrodes of the third and fourth pixels, to realize column inversion.

19. The liquid crystal display of claim 16, wherein the first and second voltage lines are alternately supplied with a highest driving voltage and a lowest driving voltage in the row direction, red, green, and blue pixels are alternately disposed in the row direction, and, first and third pixels, and second and fourth pixels having a branch arrangement of the first and second pixel electrodes reversed with respect to the first and third pixels, are respectively disposed as neighbors in the column direction.

20. The liquid crystal display of claim 11, wherein a position of the first pixel electrode with respect to the second pixel electrode of the first pixel is opposite to a position of the first pixel electrode with respect to the second pixel electrode of the second pixel.

* * * * *